March 29, 1949.   N. W. LYON   2,465,690
DIVIDER SWITCH FOR BOTTLE CONVEYER BELTS
Filed March 14, 1947   4 Sheets-Sheet 1

INVENTOR
NORMAN W. LYON
BY Chapin + Neal
ATTORNEYS

March 29, 1949. N. W. LYON 2,465,690
DIVIDER SWITCH FOR BOTTLE CONVEYER BELTS
Filed March 14, 1947 4 Sheets-Sheet 2

INVENTOR
NORMAN W. LYON
BY Chapin + Neal
ATTORNEYS

March 29, 1949.  N. W. LYON  2,465,690
DIVIDER SWITCH FOR BOTTLE CONVEYER BELTS
Filed March 14, 1947  4 Sheets-Sheet 3
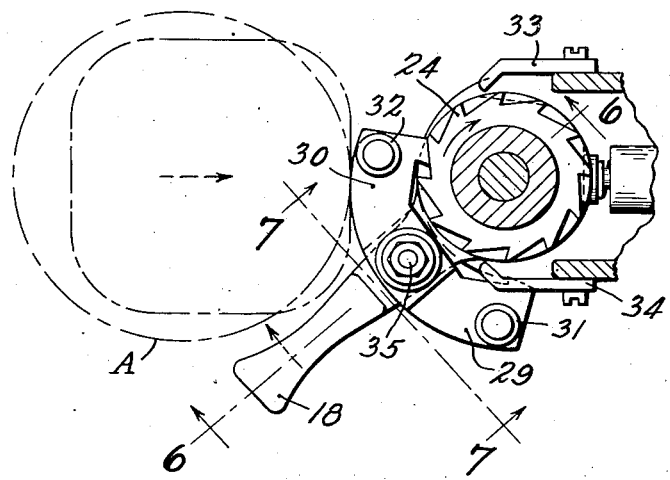
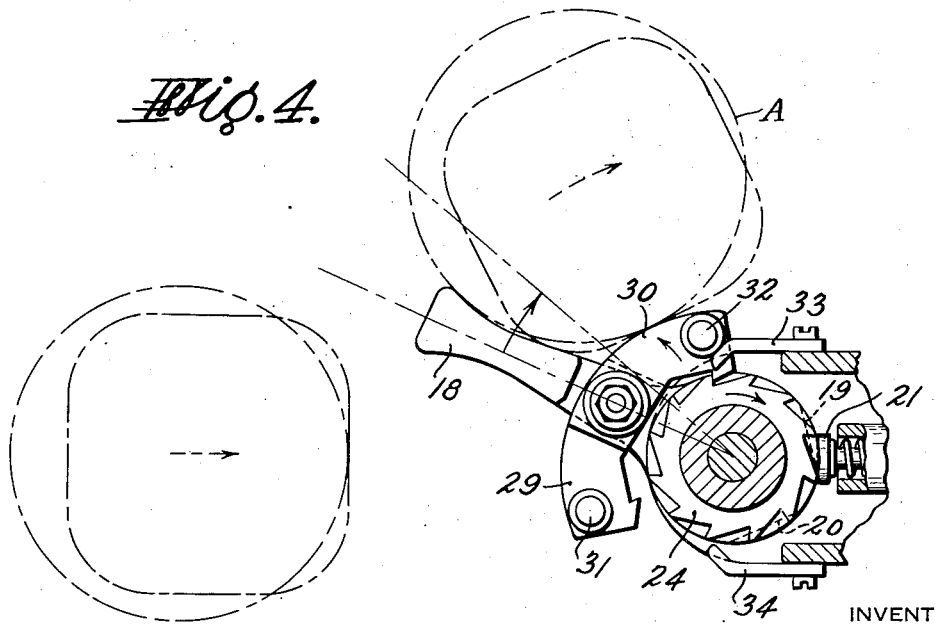
INVENTOR
NORMAN W. LYON
BY Chapin + Neal
ATTORNEYS March 29, 1949. N. W. LYON 2,465,690
DIVIDER SWITCH FOR BOTTLE CONVEYER BELTS
Filed March 14, 1947 4 Sheets-Sheet 4
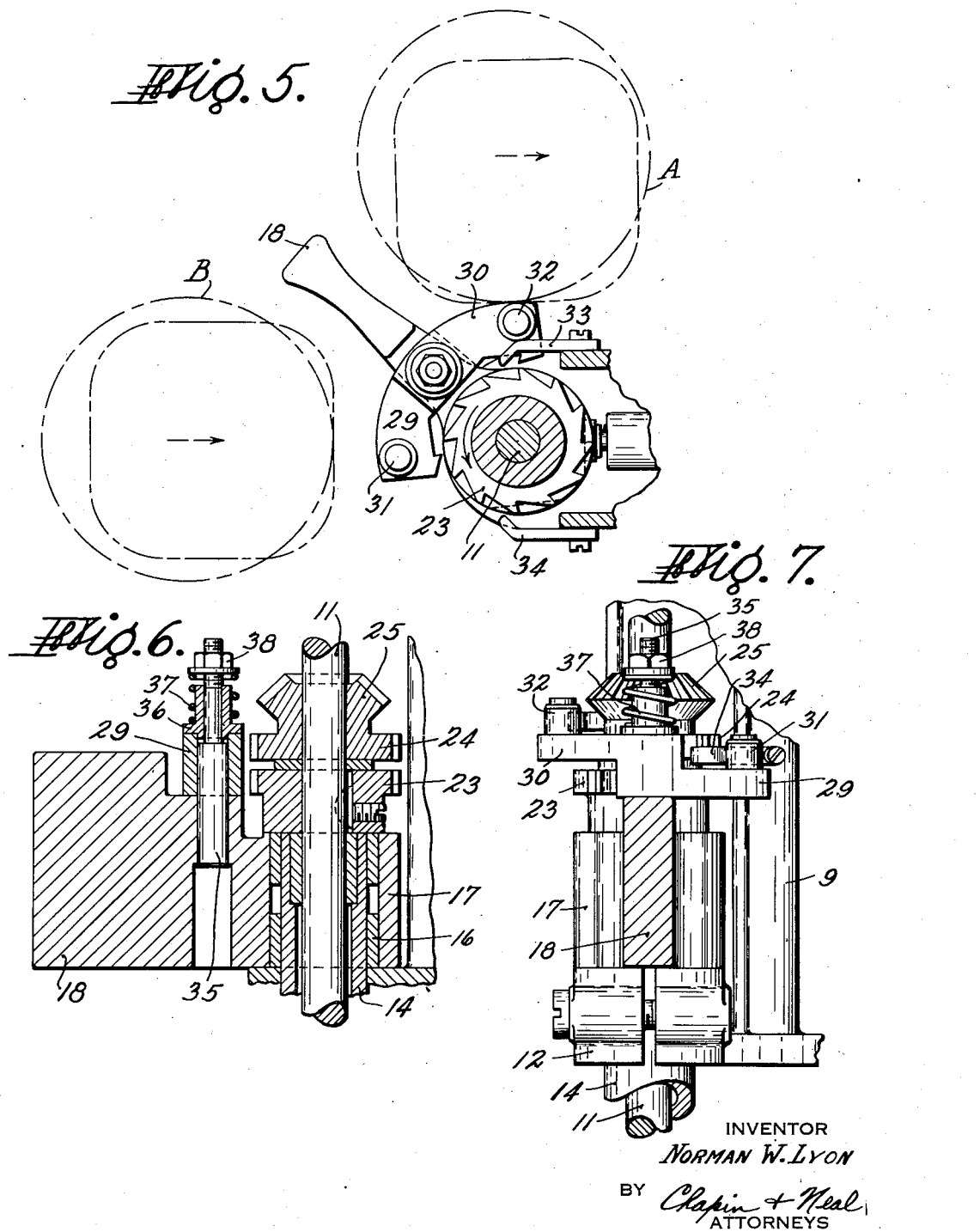
INVENTOR
NORMAN W. LYON
BY Chapin + Neal
ATTORNEYS Patented Mar. 29, 1949

2,465,690

UNITED STATES PATENT OFFICE 2,465,690

DIVIDER SWITCH FOR BOTTLE CONVEYER BELTS

Norman W. Lyon, Springfield, Mass., assignor to Package Machinery Company, Springfield, Mass., a corporation of Massachusetts Application March 14, 1947, Serial No. 734,633

7 Claims. (Cl. 198—31)

This invention relates to an endless belt conveyor system for articles such as milk bottles and the like and is more particularly directed to a divider switch for transferring the articles from an incoming conveyor alternately onto two separate outgoing conveyors. These conveyor systems are commonly employed in large dairies for the distribution of milk bottles to and from the washing machines, the filling machines, and the capping or hooding machines. It is often desirable in such systems to divide a single stream of bottles into two separate streams and the divider switch serves this purpose.

An object of the invention is to provide a power driven divider switch for the positive transfer of articles from one conveyor to the other. Heretofore the switching devices for conveyors of this character particularly when handling articles spaced at random on the incoming conveyor have relied upon the tractive force of the bottles resting on the traveling conveyor to furnish the power for the switching action. This tractive force is not, however, always reliable for positive action and consequently I have provided an outside source of power for moving the switch in combination with suitably arranged coupling means whereby an article on the incoming conveyor is called upon merely to actuate said coupling means which will require very slight tractive force, and the actual power for the transfer of the bottles is taken from said outside source.

A further object is to provide a power driven divider switch which will operate with equal smoothness and reliability whether the bottles are fed to it in a continuous stream at uniform spacing or at random spacing on said incoming conveyor.

Other and further advantages of the invention will be apparent from the following detailed description taken in connection with the accompanying drawings, in which:

Fig. 3 is a detail sectional view taken along line 3—3 of Fig. 2 and showing the action of an incoming bottle in coupling the transfer pusher to the power drive;

Fig. 4 is a similar view showing a bottle being carried by the transfer pusher toward the left hand conveyor and just prior to the uncoupling action;

Fig. 5 is a similar view but taken at section line 5—5 of Fig. 2 showing the uncoupled position of the pusher after a delivery to the left hand conveyor and also showing its position for being coupled for movement in the opposite direction for transfer to the right hand conveyor;

Fig. 6 is a vertical section along line 6—6 of Fig. 3; and

Fig. 7 is a vertical detail section along line 7—7 of Fig. 3.

Figure 1:
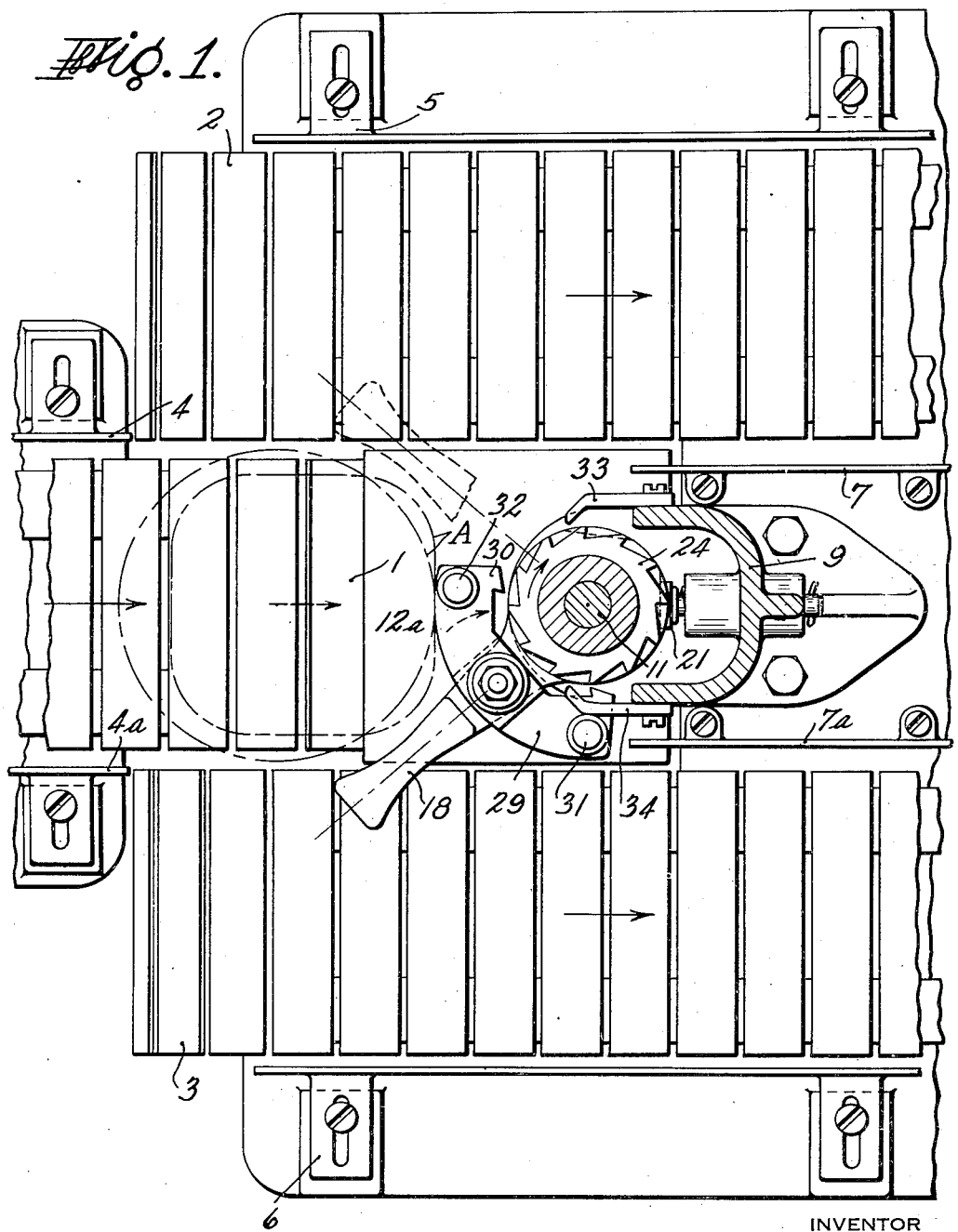
Fig. 1 is a top plan view of an incoming conveyor and two outgoing conveyors with the divider switch at the junction thereof.
Figure 2:
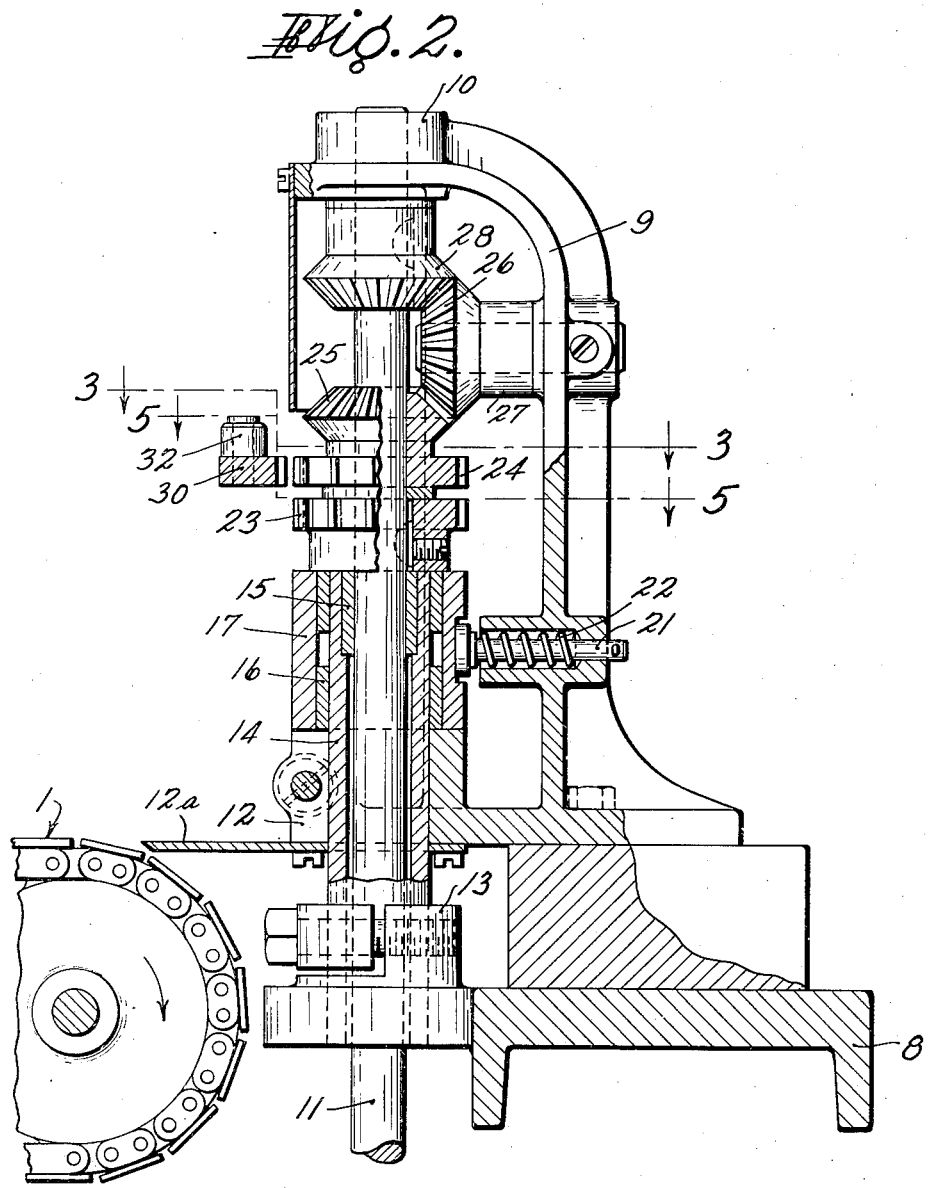
Fig. 2 is a vertical section taken along the longitudinal axis of Fig. 1.

Referring more particularly to Fig. 1 of the drawings, the incoming traveling conveyor belt is indicated at 1 and the two outgoing conveyor belts at 2 and 3. These conveyor belts are of the usual slatted type for the carrying of bottles and the like, and are driven in a continuous manner by the usual driving means not necessary to be shown. Guide walls 4 and 4a are adjustably mounted at each side of the incoming conveyor and side guides 5 and 6 are adjustably mounted at the outer sides of the outgoing conveyors 2 and 3 respectively, in combination with fixed guide walls 7 and 7a at the inner sides of said outgoing conveyors, all for the purpose well understood of adjusting the apparatus to take care of bottles or articles of different sizes.

It will be noted that the outgoing conveyors 2 and 3 overlap the end of the incoming conveyor 1 and are disposed one at each side thereof so that articles coming along on the incoming conveyor 1 may be transferred alternately to said outgoing conveyors 2 and 3 by the switch divider mechanism hereinafter described. A supporting base frame 8 has rising therefrom a vertical standard 9 which provides at its upper end a bearing 10 for a vertical shaft 11. The lower portion of said shaft is received in bearing boxes 12 and 13 which are carried on the base frame 8. A transfer platform 12a is fixed to the bottom of bearing box 12 as shown in Fig. 1. A fixed sleeve member 14 is clamped in said bearing boxes 12 and 13 and carried on the inside of said sleeve member 14 are the usual bearing bushings, such as 15 for the shaft 11. It will be understood that the lower end of shaft 11 is driven or rotated continuously in one direction by any suitable source of outside power (not shown).

Above the bearing box 12 the sleeve 14 carries bearing bushings such as 16 on the outside thereof upon which is rotatably mounted a hinge collar 17 integral with the pusher member 18. The general shape of the pusher member is shown in Figs. 1 and 6 and in the present embodiment is adapted for engaging milk bottles. This pusher member is swung back and forth across the incoming conveyor for alternately transferring the bottles to the outgoing conveyors. The rear side of the hinge collar 17 is formed with two flats 19 and 20 adapted for coaction with a check plunger 21 which is mounted in the standard 9 as shown, and adapted to be pressed by spring 22 into engagement with said flats.

Above the pusher collar 17 is mounted a ratchet wheel 23 which is keyed to the vertical shaft 11 for rotation therewith and above said ratchet wheel 23 is a second ratchet wheel 24 which is loosely mounted for rotation on said vertical shaft 11. The ratchet wheels 23 and 24 are rotated in opposite directions and the teeth thereof, as shown in a comparison of Figs. 4 and 5, are oppositely disposed for driving engagement with pawl means as hereinafter described. Ratchet wheel 24 is formed integral with a beveled gear 25 which meshes with an intermediate bevel gear 26, carried on a stud shaft mounted in a bearing 27 on standard 9 and said intermediate gear 26 meshes with an upper bevel gear 28 which is keyed to the shaft 11. By this arrangement the upper ratchet wheel 24 is given a rotation in an opposite direction to that of ratchet wheel 23 when the shaft 11 is operated.

The pusher member 18 with its collar 17 is mounted for swinging movement as heretofore described upon the outside of the fixed sleeve 14. A double ended pawl carried on pusher member 18 comprises integral right and left handed pawl arms 29 and 30, and as shown in Fig. 7, said pawl arms are at different levels, the higher pawl arm 30 being positioned for a coupling engagement with the upper ratchet wheel 24 so as to be driven thereby, and the lower pawl arm 29 being positioned for being coupled to the lower ratchet wheel 23. Each pawl arm 29 and 30 is also provided with a throw-off pin such as 31 and 32 respectively. A pawl throw-out arm 33 is fixed to the standard 9 in position to engage pin 32 and uncouple pawl 30 from its upper ratchet wheel 24 when said pusher 18 has been swung to its full distance in a clockwise direction. Similarly a throw-out arm 34 is fixed to said standard 9 in position to engage the throw-off pin 31 of the pawl arm 29 and thus uncouple the same from the lower ratchet wheel 23 when the pusher is carried to its limit of swinging movement anti-clockwise (see Fig. 1). At the end of each swinging movement of the pusher 18 the check plunger 21 will coact with the flat of said hinge collar 17 and prevent overthrow of said pusher.

The double ended pawl 29, 30 is frictionally carried on the pusher 18 as shown in Fig. 6, namely by means of a pivot pin 35 having a tight fit in the body of said plunger 18 and carrying at its upper end a friction sleeve 36 pressed downwardly by spring 37 against said double pawl. A nut 38 is screw threaded on the end of said pin 35 for adjusting the tension of the spring 37 so as to vary the pressure of said friction sleeve 36 upon said double pawl. By this arrangement it will be understood that the pawl may be rocked slightly from one position to the other and will be frictionally held in the position into which it is rocked.

The operation of my divider switch may be briefly reviewed as follows: Referring to Fig. 1 let us assume that a bottle, such as A, indicated in dotted lines, is being carried in the direction of the arrows on the incoming conveyor 1 with the pusher 18 in the position shown in full lines in said figure. When the bottle A arrives at the point shown which is closely adjacent to the end of said conveyor 1 it strikes against the upper pawl arm 30 and rocks the same slightly clockwise sufficient to couple its hook end with the upper ratchet wheel 24, as illustrated in Fig. 3. Ratchet wheel 24 since it is rotating in a clockwise direction will immediately carry the pusher 18 also in a clockwise direction, and the latter will serve to push the bottle off the conveyor 1 and onto conveyor 2. It will be observed that this push or transfer of the bottle from one conveyor to the other is positive in its action due to the outside source of driving power through shaft 11. At the end of the pusher movement in its clockwise direction the throw-out arm 33 will disengage the pawl 30 from its respective rachet wheel and said pusher will therefore remain at rest in its so-called clockwise position as indicated in Fig. 5. The next article coming along on conveyor belt 1 indicated at B in Fig. 5 will, when it reaches the end of the conveyor, then strike the lower pawl arm 29 and will connect the same to the ratchet wheel 23. The pusher will then swing in an anti-clockwise direction and transfer the bottle from conveyor belt 1 over to conveyor 3. In a manner similar to that just described, the pawl 29 will be disengaged from its ratchet by throw-out arm 34 at the end of its swinging movement and said pusher will thus be restored to its initial position as shown in Fig. 1, ready for repeating the cycle.

Various sizes and shapes of bottles may be handled by this switch divider mechanism, and the same will be positive in its action irrespective of whether the articles or bottles are coming along the incoming conveyor at random or at regular spacing.

What I claim is:

1. A divider switch for transferring articles from an incoming conveyor to separate outgoing conveyors comprising in combination, a pusher movable back and forth between said outgoing conveyors and across said incoming conveyor, a constantly operated power drive, coupling means between said power drive and pusher, said power drive and coupling means arranged to move said pusher in either direction dependent upon the operation of said coupling means, and means actuated by an article on said incoming conveyor for operating the coupling means to move said pusher in one of its directions.

2. A divider switch for transferring articles from an incoming conveyor to separate outgoing conveyors comprising in combination, a pusher movable back and forth between said outgoing conveyors and across said incoming conveyor, a constantly operated power drive, coupling means between said power drive and pusher, said power drive and coupling means arranged to move said pusher in either direction dependent upon the operation of said coupling means, means actuated by an article on said incoming conveyor for operating the coupling means to move said pusher in one of its directions, and means to disengage said coupling means at the end of said pusher movement in one direction.

3. A divider switch for transferring articles from an incoming conveyor to separate outgoing conveyors comprising in combination, a swinging pusher mounting for oscillation between said outgoing conveyors and across said incoming conveyor, a constantly operating power drive comprising two ratchet wheels rotating in opposite directions, pawl means carried by said pusher arranged to be selectively engaged with one of said ratchet wheels for swinging said pusher in one direction, and means actuated by an article on the incoming conveyor for engaging said pawl means with one of said ratchet wheels.

4. A divider switch for transferring articles from an incoming conveyor to separate outgoing conveyors comprising in combination, a swinging pusher mounting for oscillation between said outgoing conveyors and across said incoming conveyor, a constantly operating power drive comprising two ratchet wheels rotating in opposite directions, pawl means carried by said pusher arranged to be selectively engaged with one of said ratchet wheels for swinging said pusher in one direction, means actuated by an article on the incoming conveyor for engaging said pawl means with one of said ratchet wheels, and a pawl throw-out device to disengage said pawl means at the end of the swinging movement of said pusher.

5. A divider switch for transferring articles from an incoming conveyor to separate outgoing conveyors comprising in combination, a swinging pusher mounted for oscillation between said outgoing conveyors and across said incoming conveyor, a constantly operating power drive comprising two ratchet wheels rotating in opposite directions, a double pawl means, comprising one pawl member adapted to be engaged with one ratchet wheel for swinging said pusher in one direction, and another pawl member adapted to be engaged with the other ratchet wheel for swinging said pusher in the opposite direction, the said pawl members at the end of each swinging movement of said pusher being alternately carried to a position in the path of an article on said incoming conveyor so that said respective pawl member will be actuated by said article into engagement with its ratchet wheel for coupling said power drive and said pusher, and a pawl throw-out device at each side of said pusher arranged to disengage said pawl member from its ratchet wheel for terminating the swinging movement of said pusher.

6. A divider switch for transferring articles from an incoming conveyor to separate outgoing conveyors comprising in combination, a swinging pusher mounted for oscillation between said outgoing conveyors and across said incoming conveyor, a constantly operating power drive comprising two ratchet wheels rotating in opposite directions, a double pawl means, comprising one pawl member adapted to be engaged with one ratchet wheel for swinging said pusher in one direction, and another pawl member adapted to be engaged with the other ratchet wheel for swinging said pusher in the opposite direction, the said pawl members at the end of each swinging movement of said pusher being alternately carried to a position in the path of an article on said incoming conveyor so that said respective pawl member will be actuated by said article into engagement with its ratchet wheel for coupling said power drive and said pusher, a pawl throw-out device at each side of said pusher arranged to disengage said pawl member from its ratchet wheel for terminating the swinging movement of said pusher, and a check device acting on said pusher to restrain overthrow thereof at the end of its swinging movement.

7. A divider switch for transferring articles from an incoming conveyor to separate outgoing conveyors, a pusher movable back and forth between said outgoing conveyors and across said incoming conveyor, a power drive to move said pusher in either direction, means actuated by an article on said incoming conveyor to couple said pusher to the power drive for moving it in one direction, means to uncouple said pusher therefrom at the end of its movement in that direction, means actuated by a succeeding article on said incoming conveyor to couple said pusher to the power drive for moving it in the other direction and means to uncouple it therefrom at the end of its movement in the latter direction.

NORMAN W. LYON.

REFERENCES CITED

The following references are of record in the file of this patent:

UNITED STATES PATENTS

| Number | Name | Date |
| --- | --- | --- |
| 1,062,379 | Anderson | May 20, 1913 |
| 1,306,328 | Bleier | June 10, 1919 |
| 1,564,477 | Glass | Dec. 8, 1925 |
| 1,889,846 | Wright | Dec. 6, 1932 |
| 1,894,547 | Tucker | Jan. 17, 1933 |